Figure 4:
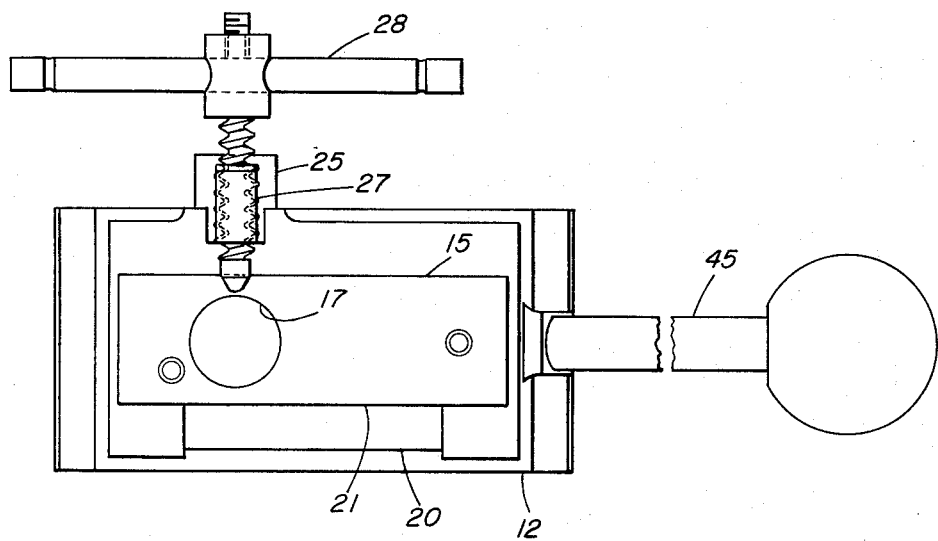

April 26, 1966     S. C. DENTON     3,247,624
LAPPING VISE
Filed Aug. 8, 1963                           2 Sheets-Sheet 1
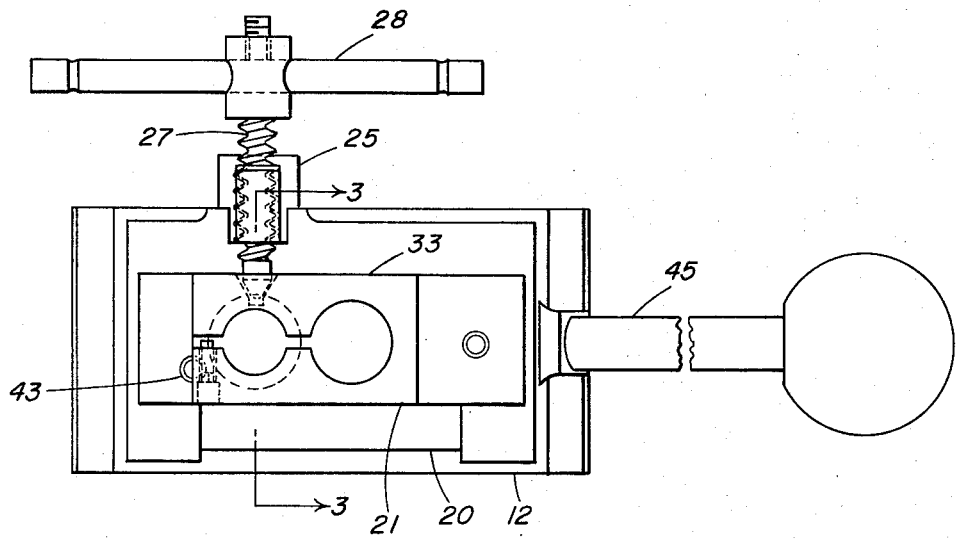
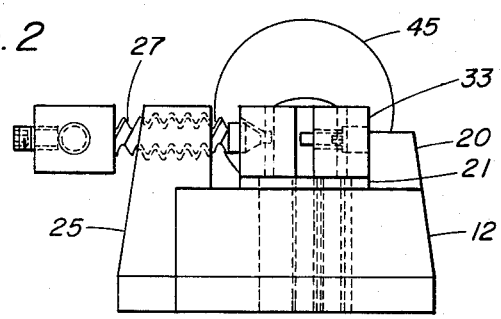
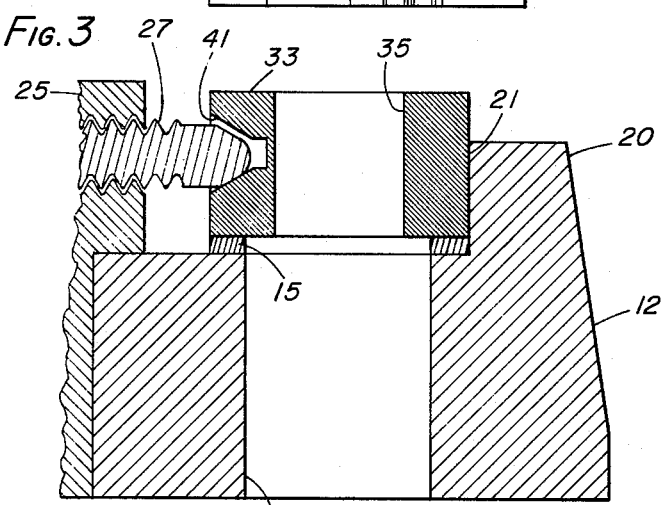
INVENTOR.
STERLING C. DENTON
BY
Roy Griffith Jones April 26, 1966 S. C. DENTON 3,247,624
LAPPING VISE Filed Aug. 8, 1963 2 Sheets-Sheet 2

INVENTOR.
STERLING C. DENTON
BY
Roy Griffith Jones though United States Patent Office 3,247,624
Patented Apr. 26, 1966

3,247,624
LAPPING VISE
Sterling C. Denton, 655 Black Oak Ridge Road,
Wayne, N.J.
Filed Aug. 8, 1963, Ser. No. 300,847
3 Claims. (Cl. 51—217)

This invention relates to a vise for holding high-precision machine parts which are to be lapped or honed.

The present vise is intended to hold, in exactly proper position, high precision machine parts to be lapped. As a specific instance of the use of the vise, and the one illustrated in the drawings, it sometimes happens, in high-precision gears having a center hole for a shaft, that the hole is not of the exact diameter required, being very slightly too small. Lapping is therefore necessary and such must be true and uniform, for which purpose the gear must be held in a true position, usually horizontally, its center hole being vertical.

The vise, as illustrated in the drawings, comprises a base the bottom of which is flat to a high degree of accuracy, and part of the upper surface of the base also has a high degree of flatness and is truly parallel with bottom of the base. A chuck, in the form of a rectangular parallelepiped, is provided to hold the work, and rests on a bed plate, with its back up against a vertical back stop attached to the base. The chuck has a vertical recess to receive the hub or boss of a gear and is partly split lengthwise, so that the split portion may be tightened against the work. To effect the tightening, and also to press the chuck up against the back stop, a screw with a conical end enters a conical recess in one side of the chuck at the split end, which recess is above the horizontal middle plane of the block so that the screw exerts in effect a downward pressure on the chuck. A lateral screw in the chuck limits the tightening action of the screw so that the chuck may not be broken.

Figure 6:
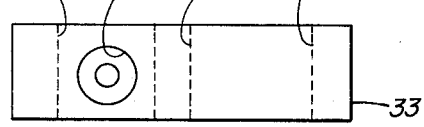
Figure 5:
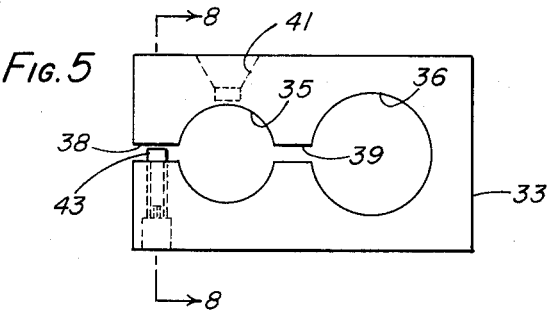
Figure 8:
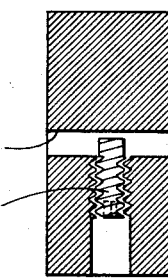
Figure 7:
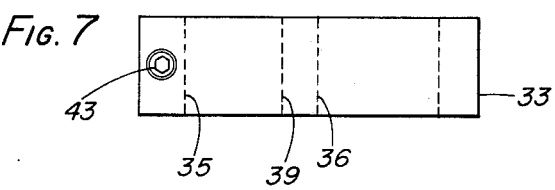
Figure 10:
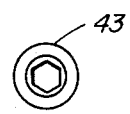
Figure 9:

The drawings illustrate the invention, and in these:
FIG. 1 is a plan view of the lapping vise;
FIG. 2 is a left end view of FIG. 1;
FIG. 3 is a vertical section on line 3—3 of FIG. 1;
FIG. 4 is a plan view of the device, omitting the chuck;
FIG. 5 is an enlarged plan view of the chuck;
FIGS. 6 and 7 are side views of the chuck;
FIG. 8 is a section on line 8—8 of FIG. 5; and
FIGS. 9 and 10 are respectively plan and head end views of a limiting screw used in the chuck.

Referring to the drawings for a detailed description, the numeral 12 indicates an oblong base, tapered in elevation at its sides and ends. That restricted part or area of the upper surface of the base which is indicated by the numeral 15 (FIG. 4), constitutes a bed plate, and is oblong in form and is elevated above the rest of the upper surface of the base, and its upper surface is accurately flat and is precisely parallel to the bottom surface of the base, which bottom surface is also accurately flat. There is a hole 17 (FIGS. 3 and 4) through the base from top to bottom for a purpose stated below.

Rising above the base, at the middle portion of one side of the base, and integral with the base, is a back stop 20 the inner vertical surface 21 of which is accurately perpendicular to the bottom of the base and to the area 15 of the upper surface, and contacts one side of the elevated portion 15 of the base.

Affixed to that side of the base which is opposite the back stop 20, there is a support 25 for a screw 27. The screw 27, which is turned by a lever 28, passes horizontally through a threaded hole in the support, at right angles to the back stop 20.

A chuck 33 is a part of the vise and is an oblong, rectangular block. The surfaces of the block are accurately planed, adjacent faces being at right angles and opposite faces parallel. The chuck is divided from top to bottom along part of its length and along its longitudinal axis, so that a work piece may be held securely thereto by tightening the divided parts against a work piece. The division is made partly by two circular, vertical holes 35 and 36, the centers of which are on the major axis of the chuck, and partly by kerfs 38 and 39, of which the former extends from the work-receiving hole 35 to the adjacent end of the chuck, and the latter between holes 35 and 36. Hole 36 serves to increase the flexibility of the divided parts and may also be used to receive a work piece. To receive the conical inner end of screw 27, the adjacent long side of the chuck has a funnel-shaped recess 41 (FIGS. 3 and 5) which is above the horizontal mid-plane of the chuck (FIG. 5), and its axis is slightly higher than the axis of the screw, so that the lateral pressure of the screw 27 will have a vertical component acting to push the chuck tight against the bed plate 15. The lateral pressure of the screw pushes the chuck up against the back stop 20. When the chuck is laid on the bed plate, in the position for the screw to enter the recess 41, the hole 35 of the chuck is centered over the hole 17 in the base, and pressure of screw 27 pulls the divided portions of the chuck toward each other.

To limit the pressure of the screw, a limiting screw 43 (FIGS. 1, 3, 8 and 9) passes laterally through one of the divided parts of the chuck, adjacent an end thereof, and extends or may extend, into the kerf 38, to the desired extent.

A knobbed handle 45 is detachably secured to one end of the base for convenience in handling the vise.

The hole 35 of the chuck, which is truly vertical to the top of bed plate 15, may receive, for example, the hub of a high precision gear, with the gear resting on the bed plate. The hub has an outside diameter slightly less than the diameter of the hole. To tighten the hub in the hole, the screw 28 is turned, which action also presses the chuck against the back stop 20. The gear is thus held in place for lapping the central aperture of the gear to very slightly enlarge it to the required diameter, as previously stated.

What is claimed is:

1. A lapping vise comprising a base having a vertical bore therein, at least part of the upper surface of the base being parallel with the bottom of the base to constitute a bed plate, a one-piece work-receiving chuck on the bed plate, a back stop secured to a side of the base and rising above the bed plate, the inner side of the back stop being flat and perpendicular to the bed plate and adjacent a side of the chuck, the chuck having flat, parallel, top and bottom surfaces, that side of the chuck contacting the back stop being perpendicular to its bottom surfaces, the chuck having a vertical recess aligned with said vertical bore to receive a work piece, and divided vertically and parallel to said back stop into two spaced portions extending at least from the recess to one of its sides, and a screw to press the divided end of said chuck laterally against the back stop and to exert lateral pressure against the divided portion of the chuck for the purpose of tightening a work piece in the recess and limit means for limiting tightening of the chuck.

2. The lapping vise specified in claim 1 in which the inner end of the screw is conical and in which one side of the chuck has a conical recess to receive the conical end of the screw, and in which the conical recess is above the middle horizontal plane of the chuck.

3. The lapping vise specified in claim 1, in which the limit means includes a horizontal limiting screw passing laterally through one of the divided portions of the chuck and adapted to enter the space between the divided portions to limit the movement of such portions thereby to avoid breaking them.

References Cited by the Examiner

UNITED STATES PATENTS

| | | | |
|---|---|---|---|
| 359,943 | 3/1887 | Smith | 51—225 |
| 1,332,277 | 3/1920 | Weaver | 269—287 |
| 1,442,932 | 1/1923 | Fegely et al. | 51—217 |
| 1,964,194 | 6/1934 | Coe | 269—288 |
| 2,882,656 | 4/1959 | Novkov | 51—217 |

ROBERT C. RIORDON, *Primary Examiner.*

HAROLD D. WHITEHEAD, *Examiner.*